United States Patent
Nelles

(10) Patent No.: US 12,437,932 B2
(45) Date of Patent: Oct. 7, 2025

(54) WOUND CAPACITOR, PULSE-CONTROLLED INVERTER AND MOTOR VEHICLE

(71) Applicant: Dr. Ing. h.c. F. Porsche Aktiengesellschaft, Stuttgart (DE)

(72) Inventor: Robert Nelles, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 167 days.

(21) Appl. No.: 18/056,725

(22) Filed: Nov. 18, 2022

(65) Prior Publication Data
US 2023/0162926 A1 May 25, 2023

(30) Foreign Application Priority Data
Nov. 22, 2021 (DE) .................. 102021130457.1

(51) Int. Cl.
*H01G 4/32* (2006.01)
*H01G 2/04* (2006.01)
*H01G 2/08* (2006.01)
*H01G 4/224* (2006.01)

(52) U.S. Cl.
CPC .............. *H01G 4/32* (2013.01); *H01G 2/04* (2013.01); *H01G 2/08* (2013.01); *H01G 4/224* (2013.01)

(58) Field of Classification Search
CPC .. H01G 4/32; H01G 4/30; H01G 2/04; H01G 2/08; H01G 4/224
See application file for complete search history.

(56) References Cited

U.S. PATENT DOCUMENTS

| | | | | |
|---|---|---|---|---|
| 3,243,672 A | * | 3/1966 | Simonds | H01G 4/28 |
| | | | | 174/15.1 |
| 3,622,846 A | * | 11/1971 | Reimers | H01G 4/32 |
| | | | | 174/15.2 |
| 5,673,168 A | * | 9/1997 | Efford | H01G 4/32 |
| | | | | 361/519 |
| 6,430,024 B1 | * | 8/2002 | Gernert | H01G 2/08 |
| | | | | 361/535 |
| 10,383,263 B2 | | 8/2019 | Skalski | |
| 10,477,733 B1 | | 11/2019 | Skalski | |
| 11,282,640 B2 | | 3/2022 | Nguyen et al. | |
| 2002/0177035 A1 | * | 11/2002 | Oweis | H01M 10/6567 |
| | | | | 429/120 |
| 2003/0038699 A1 | * | 2/2003 | Nakatsu | H01F 27/2847 |
| | | | | 336/206 |

(Continued)

FOREIGN PATENT DOCUMENTS

| | | |
|---|---|---|
| CN | 106910618 A | 6/2017 |
| CN | 111817580 A | 10/2020 |

(Continued)

*Primary Examiner* — Michael P McFadden
(74) *Attorney, Agent, or Firm* — LEYDIG, VOIT & MAYER, LTD.

(57) ABSTRACT

A wound capacitor is provided, the wound capacitor including a cooling channel for conducting coolant. The provided cooling channel includes an electrically non-conductive and thermally conductive material. A pulse-controlled inverter including the wound capacitor is provided. A motor vehicle including the pulse-controlled inverter and the wound capacitor are also provided.

19 Claims, 4 Drawing Sheets

(56) References Cited

U.S. PATENT DOCUMENTS

| | | | | |
|---|---|---|---|---|
| 2003/0133255 | A1* | 7/2003 | Reiner | H01G 4/224 |
| | | | | 361/517 |
| 2006/0060329 | A1* | 3/2006 | Imura | C09K 5/10 |
| | | | | 165/104.26 |
| 2007/0177335 | A1* | 8/2007 | Thrap | H01G 9/0003 |
| | | | | 361/502 |
| 2008/0289857 | A1* | 11/2008 | Mauroux | H01B 19/04 |
| | | | | 174/158 R |
| 2009/0219667 | A1* | 9/2009 | Eriksson | H01G 9/008 |
| | | | | 29/25.42 |
| 2010/0188082 | A1* | 7/2010 | Morich | G01R 33/481 |
| | | | | 250/363.04 |
| 2014/0126107 | A1* | 5/2014 | Yoda | H01G 4/385 |
| | | | | 361/303 |
| 2016/0365197 | A1* | 12/2016 | Lavene | H01G 9/0003 |
| 2022/0384105 | A1* | 12/2022 | Wiecek | E21B 7/15 |

FOREIGN PATENT DOCUMENTS

| | | |
|---|---|---|
| DE | 875966 C | 5/1953 |
| DE | 19854626 A1 | 6/2000 |
| DE | 102012001558 A1 | 8/2013 |
| DE | 102013216941 A1 | 2/2015 |
| DE | 102018127576 A1 | 5/2019 |
| DE | 102018215522 A1 | 3/2020 |
| JP | 2008300600 A | 12/2008 |

* cited by examiner

WOUND CAPACITOR, PULSE-CONTROLLED INVERTER AND MOTOR VEHICLE

CROSS REFERENCE TO RELATED APPLICATIONS

This application claims benefit to German Patent Application No. DE 10 2021 130 457.1, filed on Nov. 22, 2021, which is hereby incorporated by reference herein.

FIELD

The present invention relates to a wound capacitor. The present invention further relates to a pulse-controlled inverter having such a wound capacitor and a motor vehicle having such a pulse-controlled inverter.

BACKGROUND

The drive train of an electric vehicle typically includes a battery, an electric motor and an inverter for converting the DC voltage provided by the battery into the multi-phase AC voltage needed to drive the electric motor. A DC link capacitor is typically assigned to the inverter as an energy buffer. The DC link capacitor is used to decouple the DC voltage source (battery) and the electric drive train.

The DC link capacitor is used to smooth the switching operations of the pulse-controlled inverter to the HV vehicle electrical system or the battery. The harmonics created by the switching operations of the inverter are smoothed by the capacitor to stabilize the DC voltage. The feeding DC voltage is thus stabilized with the help of the capacitor.

The DC link capacitor used here is a plastic film capacitor (referred to technically as "Folko", FIGS. 1 and 2), for example, which is wound in an alternating layering of electrically conductive metal layers (11) and dielectric plastic layers (12). Together with analogously constructed paper, metal paper, double layer, aluminum and tantalum electrolytic capacitors, such capacitors are collectively referred to as "wound capacitors".

The current flows in the DC link are largely responsible for the losses in the DC link capacitor. The constant fluctuations caused by the switching operations of the power semiconductors produce a ripple current that has to be damped. The ripple current component in the DC link capacitor produces a power loss that is released in the form of heat. Said heat is dissipated to the coolant via plates carrying cooling liquid or other heat sinks, and ultimately to the environment in a coolant radiator. The thus retooled coolant can be returned to the capacitor in a closed circuit.

The low thermal conductivity of the film winding allows the surface of the capacitor body to be cooled effectively, but not its interior where, according to the prior art, hot regions (hot spots) sometimes form.

Such hot spots limit the performance of the capacitor and therefore also that of the connected pulse-controlled inverter. The overheating of conventional capacitors thus inhibits the performance improvement of drive systems for electric vehicles.

DE 10 2013 216 941 A1 and DE 10 2018 215 522 A1 teach the forming of duromer cooling channels for cooling the DC link capacitor of a pulse-controlled inverter in the drive train of an electric vehicle.

SUMMARY

In an embodiment, the present disclosure provides a wound capacitor, comprising a cooling channel for conducting coolant, wherein the cooling channel comprising an electrically non-conductive and thermally conductive material.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present invention provides a wound capacitor, a corresponding pulse-controlled inverter and a corresponding motor vehicle.

One advantage of embodiments of the present invention lies in the possibility of optimizing the flow control. In view of the given coolant conducting system, the pressure of the coolant is easily adjustable.

In an advantageous embodiment, a configuration of cooling channels using electrically non-conductive, thermally conductive material such as plastic, preferably fiber-reinforced, duromer plastics, which have high temperature resistance and high resistance to the coolants is provided.

The use of a water-glycol mixture, which has a high thermal capacity and can therefore better absorb and thus dissipate heat, can furthermore be provided as the coolant.

Figure 1:
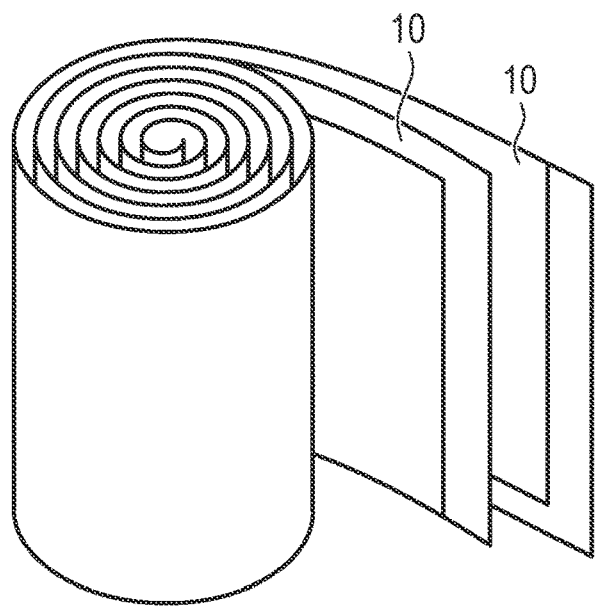
FIG. 1 shows the perspective view of a wound capacitor according to the prior art.
Figure 2:
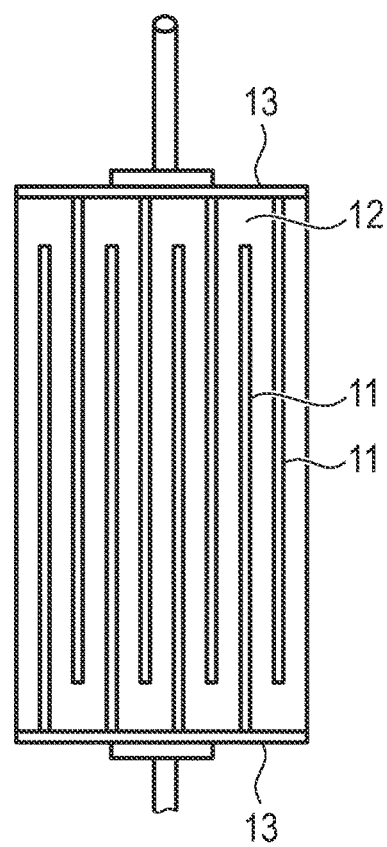
FIG. 2 shows the structure of the wound capacitor in a schematic longitudinal section.
Figure 3:
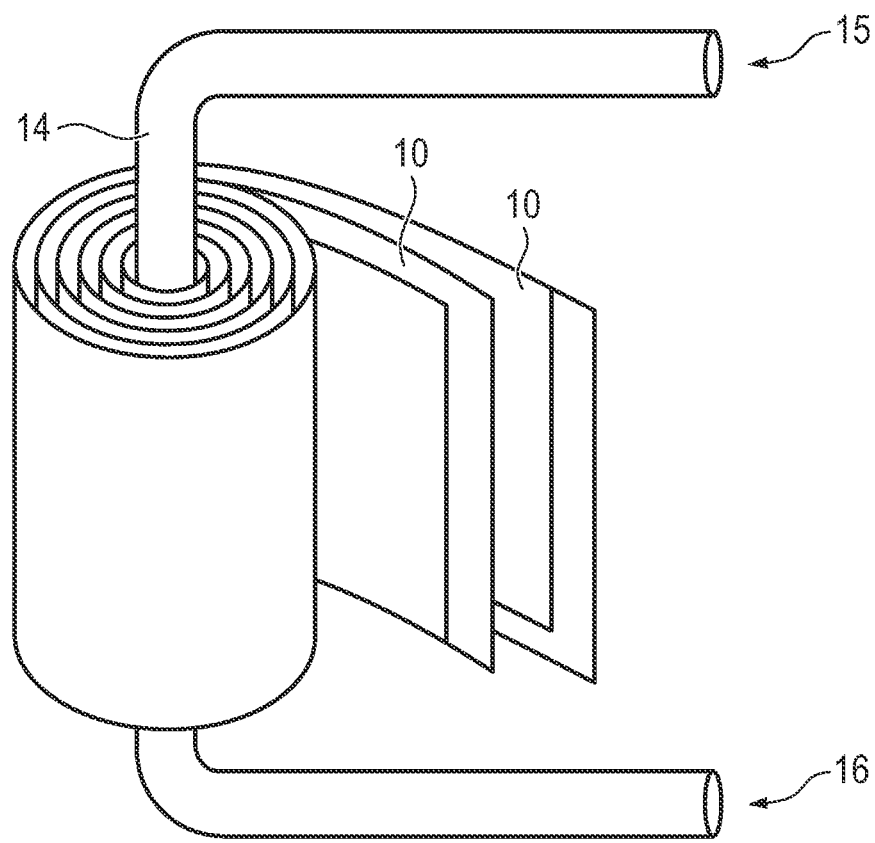
FIG. 3 shows a view of a first variant of an embodiment of the invention corresponding to the view of FIG. 1.
Figure 4:
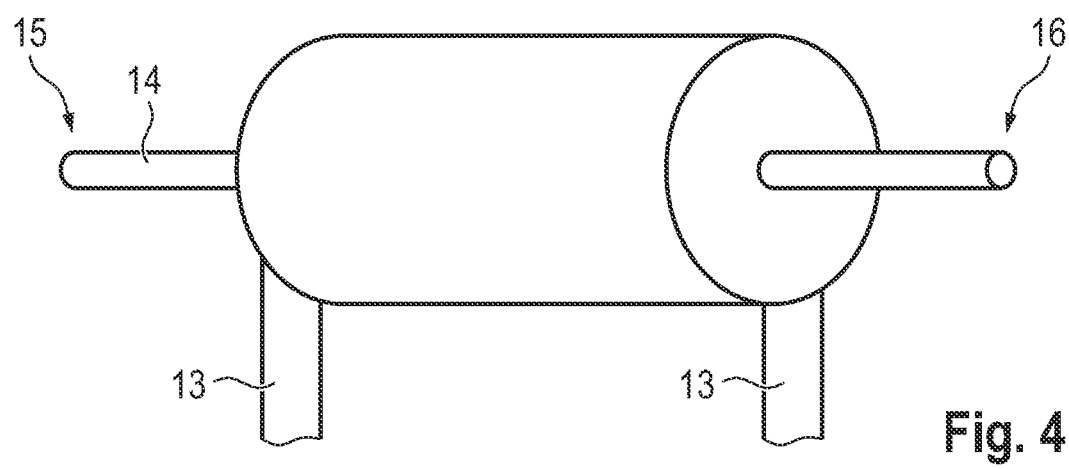
FIG. 4 shows a perspective view of a second variant of an embodiment of the invention.

FIGS. 3 and 4 both illustrate a wound capacitor (10) according to an embodiment of the invention having a cooling channel (14). The plastic used for the cooling channel (14) (for example a fiber-reinforced duromer) is thermally conductive, electrically non-conductive and chemically resistant to the coolant, which can be a water-glycol mixture, for example.

As looking at FIGS. 3 and 4 together suggests, the possibilities for arranging such cooling channels (14) made of plastic are virtually limitless. However, both in terms of production practicality and for optimum cooling, heat dissipation at the central hot spot is recommended. In both variants, therefore, the respective cooling channel (14) extends coaxially through the wound capacitor (10).

The extensions of the inlet (15) and the outlet (16) of the wound capacitor (10), on the other hand, are different in the shown embodiments: Whereas they are aligned radially to the wound capacitor (10) in the embodiment according to FIG. 3, the inlet (15) and the outlet (16) according to FIG. 4 extend in the axial extension of the wound capacitor (10) and thus perpendicular to the front-side electrical terminals (13) thereof.

Figure 5:
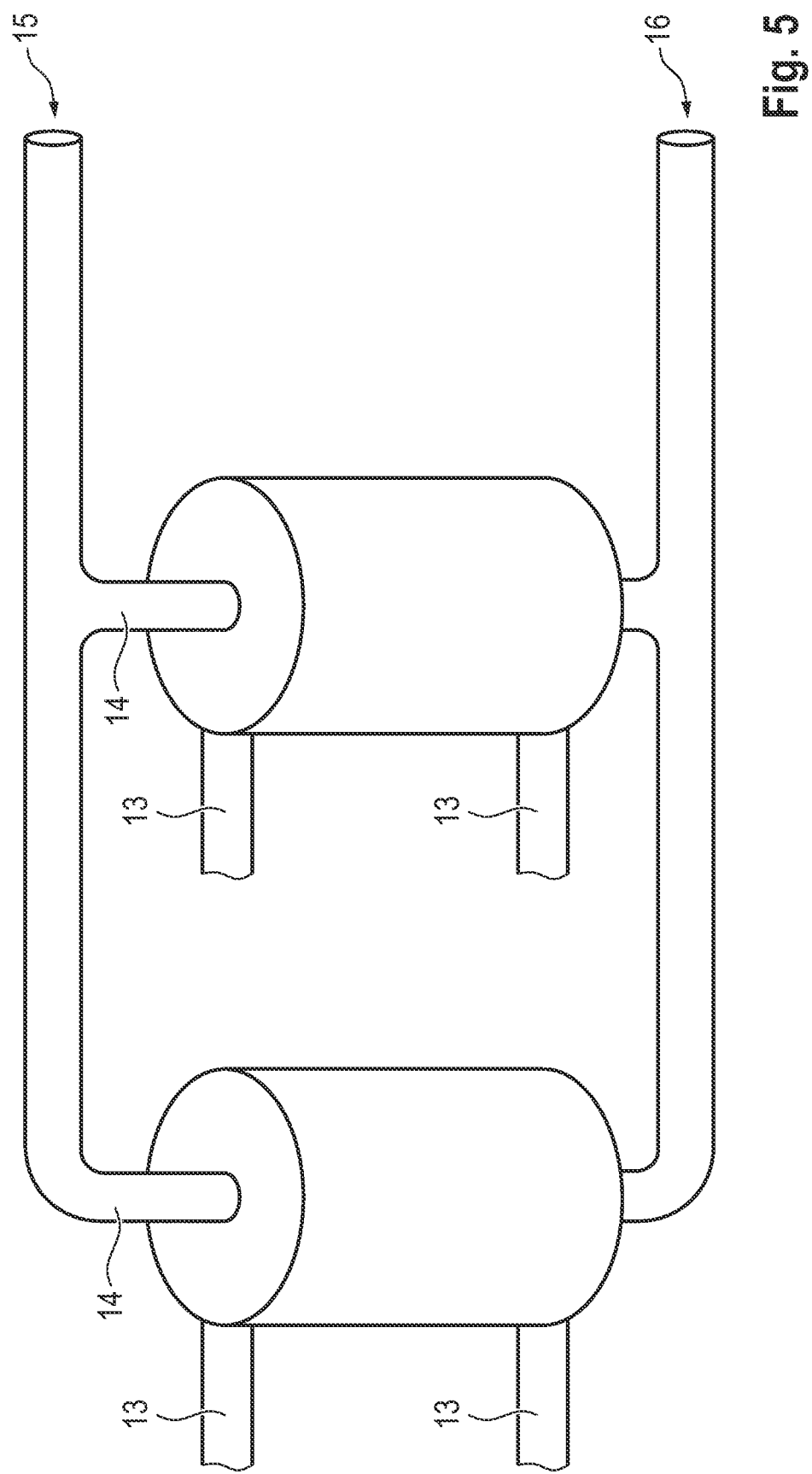
FIG. 5 shows a perspective view of a third variant of an embodiment of the invention.
Figure 6:
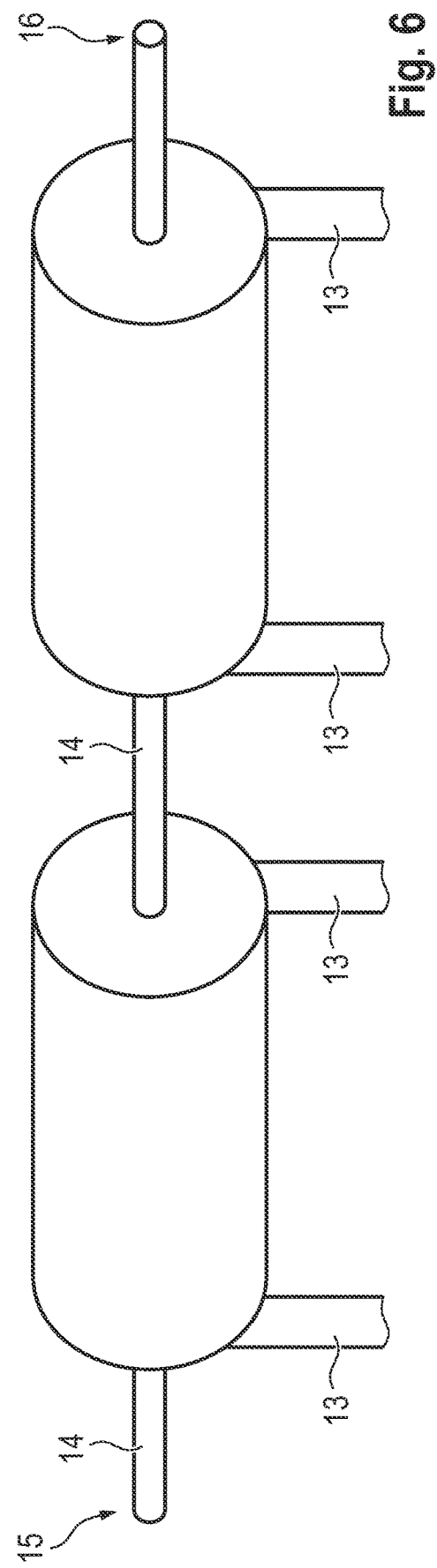
FIG. 6 shows a perspective view of a fourth variant of an embodiment of the invention.

An embodiment can also provide that a plurality of wound capacitors have consecutive radial cooling channels which are interconnected (see FIG. 5 and FIG. 6). In this case, the capacitors can be connected in parallel or in series via busbars, for example made of copper or aluminum.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A wound capacitor, comprising a cooling channel for conducting coolant, wherein the cooling channel comprises an electrically non-conductive and thermally conductive plastic, and a second wound capacitor arranged in series with the wound capacitor, wherein a linear segment of the cooling channel extends coaxially to the wound capacitor and the same linear segment of the cooling channel extends coaxially to the second wound capacitor.

2. The wound capacitor according to claim 1, wherein the plastic used to form the cooling channel is heat-resistant and thermally conductive.

3. The wound capacitor according to claim 2, wherein the cooling channel extends parallel to an axis of the wound capacitor.

4. The wound capacitor according to claim 3, wherein the cooling channel extends coaxially to the wound capacitor.

5. The wound capacitor according to claim 2, wherein the cooling channel has an inlet which extends radially to the wound capacitor.

6. The wound capacitor according to claim 2, wherein the wound capacitor has metallic electrodes, and the wound capacitor has a dielectric between the electrodes.

7. The wound capacitor according to claim 6, wherein the wound capacitor has front-side terminals, and the front-side terminals are electrically connected to the electrodes.

8. The wound capacitor according to claim 1, wherein the coolant is a liquid and the coolant can dissipate heat.

9. The wound capacitor according to claim 1, wherein the cooling channel extends parallel to an axis of the wound capacitor.

10. The wound capacitor according to claim 9, wherein the cooling channel extends coaxially to the wound capacitor.

11. The wound capacitor according to claim 1, wherein the cooling channel has an inlet which extends radially to the wound capacitor.

12. The wound capacitor according to claim 1, wherein the wound capacitor has metallic electrodes, and the wound capacitor has a dielectric between the electrodes.

13. The wound capacitor according to claim 12, wherein the wound capacitor has front-side terminals, and the front-side terminals are electrically connected to the electrodes.

14. A pulse-controlled inverter comprising a DC link, the DC link including the wound capacitor according to claim 1.

15. A motor vehicle, comprising an electric drive train, the drive train having the pulse-controlled inverter according to claim 14.

16. The wound capacitor according to claim 1, wherein the plastic used to form the cooling channel is chemically resistant to the coolant.

17. The wound capacitor according to claim 1, wherein the cooling channel has an outlet which extends radially to the wound capacitor.

18. The wound capacitor according to claim 1, wherein the non-conductive and thermally conductive plastic comprises a fiber-reinforced duromer plastic.

19. The wound capacitor according to claim 1, wherein the cooling channel is configured to receive a coolant comprising a water-glycol mixture.

\* \* \* \* \*